United States Patent
Eaton

[11] 3,862,395
[45] Jan. 21, 1975

[54] HTW HEATING SYSTEMS HAVING ELECTRODE BOILERS AS THE SOURCE OF HTW

[75] Inventor: Milton Eaton, Shawinigan, Canada

[73] Assignee: General Electric Company, Shelbyville, Ind.

[22] Filed: Nov. 22, 1972

[21] Appl. No.: 308,734

[30] Foreign Application Priority Data
Nov. 23, 1971 Canada .............................. 128409

[52] U.S. Cl. .................... 219/284, 122/31, 219/287, 219/326, 237/58, 237/63
[51] Int. Cl. ......... H05b 3/60, F22b 1/16, F24d 3/02
[58] Field of Search ........................... 219/284–295, 219/271–276, 325, 326; 237/58, 67; 122/31

[56] References Cited
UNITED STATES PATENTS

| | | | |
|---|---|---|---|
| 1,503,972 | 8/1924 | Berg................................ | 219/284 X |
| 1,522,474 | 1/1925 | Horstkotte ...................... | 219/286 X |
| 2,562,184 | 7/1951 | Grondahl .......................... | 219/285 |
| 2,612,593 | 9/1952 | Mittendorf et al.................. | 219/287 |

FOREIGN PATENTS OR APPLICATIONS

| | | | |
|---|---|---|---|
| 22,590 | 10/1905 | Great Britain ........................ | 237/58 |
| 363,336 | 12/1932 | Great Britain ....................... | 237/58 |
| 660,765 | 2/1929 | France ................................ | 237/58 |

*Primary Examiner*—A. Bartis

[57] ABSTRACT

An HTW space heating system in which an automatic electrode steam boiler and a direct contact steam heater are used as the source of HTW. Pumping means is provided for circulating HTW through the heating system. Pumping means responsive to the boiler feedwater regulator diverts water from the heating system to the boiler in which it is converted to steam at the set point pressure of the boiler steam pressure controller. The boiler steam outlet is connected with a direct contact steam heater by a pipe in which a control valve responsive to a pressure controller is located. The controller measures the heater steam pressure and regulates the control valve to maintain the pressure at a constant value lower than that of the boiler steam pressure. A mixing valve, responsive to a temperature controller which measures the temperature of the HTW entering the heating system, causes a portion of the HTW circulated through the heating system to be diverted through the heater where it is heated to a temperature approximately that of the steam with which it makes intimate contact. The resulting HTW, including condensed steam, enters the HTW storage compartment of the heater from which it passes through the mixing valve into the heating system at the same rate as the HTW is diverted through the boiler and the heater. The HTW storage compartment of the heater is connected with the boiler below the electrodes by a pipe in which a control valve responsive to a conductivity controller is located. This controller measures the conductivity of the boiler water and functions to transfer boiler water to the heater HTW storage compartment as required to return to the heating system soluble salts carried into the boiler by the feedwater, thereby maintaining the conductivity of the boiler water at its normal value. A blowdown pipe connected to the boiler is provided with a control valve responsive to a conductivity controller which measures the conductivity of the HTW circulated through the heating system, thereby limiting the conductivity of the HTW in the system. A make-up water connection is provided on the direct contact steam heater for admission of make-up water to the system. The direct contact steam heater is provided with sufficient HTW storage space and maintained at a suitable steam pressure to serve as the pressurized expansion tank for the heating system.

3 Claims, 1 Drawing Figure

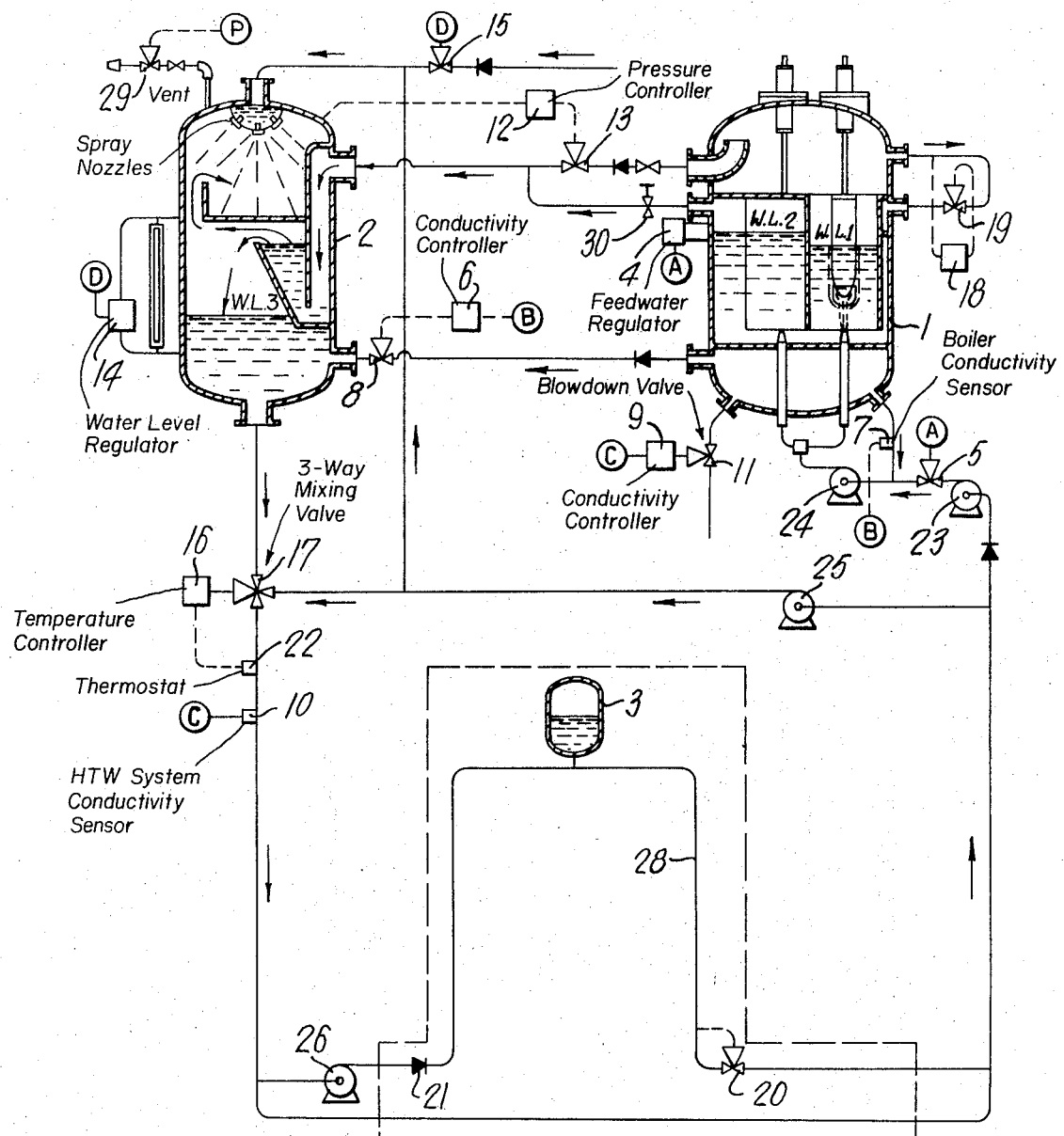

HTW HEATING SYSTEMS HAVING ELECTRODE BOILERS AS THE SOURCE OF HTW

BACKGROUND OF INVENTION

1. Field of Invention

This invention relates to improvements in HTW heating systems having electrode steam boilers as the source of HTW.

2. Description of Prior Art

Electrode hot water boilers are available for this application, but it has been found that for large boilers, operated at high voltages, operating conditions tend to make their operation less satisfactory than that of electrode steam boilers. This is mainly due to the relatively small amount of heat that can be taken by a unit volume of water admitted to a hot water boiler and to the wide range of energy concentration in the water between the tips of the electrodes and the neutrals. To prevent steam formation at the tips of the electrodes causing increased energy concentration, flashing and electrode wastage, it is necessary to recirculate at a high rate the water admitted to an electrode hot water boiler of the class concerned. Oscillation of the streams of water directed towards the electrode tips introduces a problem which was solved for electrode steam boilers by maintaining a critical relation between stream or jet diameter, jet length and jet velocity. In a steam boiler these jets are not more than 1 inch in diameter. Streams 3 or 4 inches in diameter, required for an HTW boiler of the same size, might be more difficult to control. In any case, it has been found with the use of an experimental pyrex boiler, operated at 2.2 kv and with normal electrode current, that a stream of water directed towards its hemispherical electrode tip tends to oscillate around it with a flashing condition in its wake.

SUMMARY OF INVENTION

It is an object of the invention to provide improvements in HTW heating systems having electrode steam boilers as the source of HTW wherein steam is converted to HTW economically.

In accordance with the present invention, there is provided, in HTW heating systems, the improvement comprising means for taking water from said system and converting it to steam in an electrode steam boiler, means for limiting the accompanying transfer of soluble salts to the boiler, means for converting the steam to HTW in a direct contact steam heater and means for returning the HTW to the heating system at a rate proportional to the demand for heat.

In accordance with the present invention, there is also provided a process for converting water containing soluble salts from an HTW heating system to steam in an electrode steam boiler comprising limiting transfer of said soluble slats to the boiler, converting the steam to HTW in a direct contact steam heater and returning the HTW to the heating system at a rate proportional to the demand for heat.

In accordance with a preferred tangible embodiment thereof, the HTW heating system of the present invention as defined above, further comprises:

1. means for maintaining a constant boiler steam pressure, 2. steam communication between the boiler and a direct contact steam heater having in it a control valve responsive to a controller which functions to maintain the steam pressure in the steam heater lower than the boiler steam pressure and 3. water communication including control means whereby the steam pressure in the direct contact steam heater becomes the basic heating system pressure and HTW is supplied to the heating system at a rate proportional to the demand for heat.

Further objects and embodiments of the present invention will become clear from the description to follow.

BRIEF DESCRIPTION OF THE DRAWING

The present invention will be better understood from the following detailed description of preferred embodiments of it, reference being made to the accompanying drawing showing schematically equipment embodying the system according to the invention with its arrangement and interconnections.

A Canadian General Electric (Eaton) electrode steam boiler 1 and an Ecodyne Limited (Graver) direct contact steam heater 2 are shown schematically in cross section.

Controller 18 with valve 19 and a discharge of steam through valve 30 function to maintain the boiler steam pressure on the controller set point by varying WL1 in accordance with the load demand. Controller 4 with valve 5 maintains WL2 by regulating the rate of admission of feedwater delivered by pump 23. Pump 24 provides a water-jet action and water conductivity is controlled as described below. For a complete description of the boiler see Sec. 8-13, Standard Handbook for Electrical Engineers, 10th Edition.

The direct contact steam heater 2 is a deaerating heater modified to suit this application. It is designed to heat the water to within 3° of steam temperature. Non-condensable gases are released through the vent. Controller 14 with valve 15 maintains WL3 by admitting make-up water to replace leakage losses and adequate water storage space is provided for the heater to function as a pressurized expansion tank for the heating system.

To facilitate the discharge of steam from the boiler control compartment through valve 30 at a constant rate for control purposed, and the transfer of boiler water to the steam heater through valve 8, controller 12 with valve 13 functions to reduce the steam pressure in the steam heater and therefore the heating system pressure to a value lower than that of the boiler steam pressure.

Pump 25 circulates HTW through the heating system at a constant rate, and controller 16 with thermostat 22 and mixing value 17 functions to mix recirculated water with water from steam heater 2 in the proportion required to maintain the temperature of the water entering the heating system at the control set point. The rate of flow is determined by the desired maximum decrease in the temperature of the HTW as it passes through the heating system.

This is a closed heating system in the operation of which the boiler water conductivity tends to increase and that of the heating system to decrease owing to transfer of salts in solution to the boiler. Conductivity controller 6 with conductivity cell 7 and valve 8 functions to hold the boiler water conductivity at the controller set point by returning boiler water to the heating system. This process also maintains the alkalinity of the HTW above the minimum required for a non-corrosive pH value of the liquid.

If leakage water or steam carries with it less salts than are admitted with the make-up water, the conductivity of the HTW in the heating system will tend to increase and is held at a predetermined value by the operation of conductivity controller 9 with conductivity cell 10 and boiler blowdown valve 11. Controller 6 should have proportional-position action, whereas controller 9 might be the more simple on-off type.

In the event of a power failure, boiler and pump operation stop, vent control valve 29, with connection P made responsive to boiler voltage, assumes a normally closed position and both the heater and boiler function as steam accumulators to maintain the heating system pressure above the HTW saturation pressure, thus preventing the formation of flash steam. The required minimum static pressure of a heating system having a high section 28 may be limited with the use of a booster pump 26 and check valve 21 at the upstream end, a back-pressure control valve 20 at the downstream end and a compression tank 3, preferable at the top.

The use of an electrode steam boiler with a direct contact steam heater as the source of HTW is made economic partly by making equipment serve multiple purposes. No separate pressurized expansion tank is required and the steam heater performs the function of a make-up water deaerator.

The following Example will further illustrate the invention.

EXAMPLE

1. A boiler rating of 20 MW, 13.2Kv, operating at 225 psig.
2. The steam pressure to be reduced by controller 12 and valve 13 to 200 psig.
3. Make-up water conductivity of 70 mm-cm 25°C.
4. Normal boiler water conductivity of 120 mm-cm 25°C.
5. The temperature of the water as regulated by controller 16 with valve 17 to be 300°F.

On start-up the boiler water conductivity is raised to 120 mm-cm by the addition of a suitable salt solution. Alternatively, if not more than half load is required, the heating system and the boiler may be supplied with water of the 70 mm-cm conductivity. As operation proceeds, the conductivity of the boiler water will gradually rise to the set point of controller 6, which is 120 mm-cm, and the conductivity of the heating system water falls to a value depending on relative volumes of water, in this case 60 mm-cm. It is assumed that the conductivity of the water is directly proportional to the salt content measured in ppm and that the steam from the boiler has a salt content proportional to the amount of moisture, or carry-over, in it. Allowing for carry-over, the required rate of boiler water transfer through valve 8 is about 45 percent of the rate of steam generation.

With a heating load of 20 MW the temperature of the water passing through the heating system falls from 300° to 225°F, the boiler feedwater temperature at full load is 225°F. With a boiler steam pressure of 225 psig, 172 Btu/lb is required to raise the temperature of the feed-water to the saturation temperature of 397°F. For each pound of water converted to steam with (829 + 172) or 1,001 Btu, 0.45 lbs of boiler water taking (0.45 × 172) or 77 Btu is discharged to the steam heater as HTW. 77/(1,001 + 77) × 100 or 7.15 percent of the heating load is therefore supplied as HTW.

92.85 percent or 18,570 kW of the 20 MW load is used in raising (18,570 × 3,412)/1,001 or 63,500 lbs/hr of steam. The remaining 1,430 kW supplies (1,430 × 3,412)/172 or 28,400 lbs/hr of HTW.

The water taken directly from the boiler is at a higher pressure and temperature than the water in the heater. The drop in pressure through valve 8 produces flash steam which with the transferred boiler water tends to hold the temperature of the water in the heater close to the heater steam temperature of 387°F (at 200 psig).

The water taken from the steam heater is to be heated to 380°F. Therefore, at full heating load of 20 MW, the output is (20,000 × 3,412)/(380 − 225) or 438,000 lbs/hr, of which 28,400 lbs/hr is HTW taken directly from the boiler and 63,500 lbs/hr is condensed steam.

In accordance with this invention, there is provided economic means for using an electrode steam boiler, operating under normal operating conditions, to supply the heat for an HTW heating system, and means for regulating the conductivity of the water. Details in the design of the heating system, including water treatment, have been omitted since they are well known to those skilled in the art.

Advantages as compared with the use of an electrode hot water boiler include:

1. Precise automatic boiler steam pressure and power input control over a load range down to 2 percent of the boiler rated capacity.
2. No boiler insulators are immersed in the boiler water and thereby exposed to contamination due to the normal rate of electrode wastage, which for the electrode steam boiler is insignificant.
3. Objectionable ground currents caused by phase imbalance and shifting of the electrical neutral is not a characteristic of the operation of electrode steam boilers of the design shown in the drawing.
4. Difficulties associated with the required rate of boiler water recirculation and the wide range of energy concentration in the water between the electrode tips and the neutrals are nonexistent.
5. Steam is available for other use.
6. Maintenance costs are low.

MODIFICATIONS

The preferred embodiments of the invention have been described in detail. Modifications may, however, be made without departing from the spirit or scope thereof. For example:

1. Provision may be made for other use of part of the steam generated.
2. If the boiler of the example were operated at 6.6 kv, the electrode diameter would be greater and the boiler water conductivity would be about 250 mm-cm. This would proportionally decrease the rate of boiler water discharge for conductivity control.
3. To limit peak loads, of which the boiler load is part, conventional means for using either HTW storage or transfer of load to an oil-fired boiler may be applied.

It will be understood that various modifications in addition to those above mentioned can be made in the specific embodiments disclosed without departing from the spirit of the invention or the scope of the claims.

I claim:

1. In an HTW space heating system in which an automatic electrode steam boiler having a feedwater regulator and a boiler steam pressure controller together with a direct contact steam heater having steam communication with the boiler steam outlet, a vent for non-condensable gases and HTW communication with the space heating system are used as the source of HTW which is circulated by pumping means through the space heating system, the improvement comprising
   a. pumping means responsive to the said boiler feedwater regulator for diverting water from the heating system to the electrode steam boiler in which it is converted to steam at the set point pressure of the said boiler steam pressure controller, the water diverted from the heating system being replaced by HTW from the direct contact steam heater passing through the pipe forming the said HTW communication with the heating system under the steam pressure in the direct contact steam heater which functions as the heating system static pressure,
   b. control valve means responsive to a temperature controller which measures the temperature of the water entering the heating system and causes water to be diverted from the heating system to the said direct contact steam heater in which it is heated and from which it is returned as HTW to the heating system as required to maintain the temperature of the water entering the heating system at the set point temperature of the said temperature controller,
   c. a pipe connection between the water-containing zone of the electrode steam boiler and the HTW storage zone of the direct contact steam heater in which a control valve responsive to a boiler water conductivity controller is located, a blowdown pipe connection with the boiler in which a control valve responsive to a conductivity controller measuring the conductivity of the water circulated through the heating system is located and a make-up water connection with the direct contact steam heater through which the admission of make-up water having a lower conductivity than that of the boiler water is regulated by a control valve responsive to a controller which measures the water level in the said HTW storage zone of the direct contact steam heater, the said controllers with their associated control valves function to transfer boiler water (HTW) to the direct contact steam heater as required to return to the heating system soluble salts carried into the boiler by the boiler feedwater thereby maintaining normal boiler water conductivity and to blow down boiler water replaced with make-up water of a lower conductivity as required to limit the conductivity of the water circulated through the heating system.

2. A system according to claim 1 wherein a control valve responsive to a pressure controller is located in a pipe forming the said steam communication means between said boiler steam outlet and the direct contact steam heater, the said pressure controller being made to measure the steam pressure in the heater and to operate the said control valve to maintain the measured pressure at a constant value equal to the set point pressure of the said controller and lower than that of the boiler steam pressure.

3. A system according to claim 1 wherein the said direct contact steam heater constitutes a pressurized expansion tank for the heating system and comprising means maintaining a suitable controller steam pressure in the heater, means providing sufficient HTW storage space, means providing steam communication with the steam outlet of the said electrode steam boiler and water communication with the HTW in the heating system, and a control valve located in the said heater vent for non-condensable gases which closes in response to boiler power failure.

* * * * *